(12) United States Patent
Hung et al.

(10) Patent No.: US 11,881,025 B1
(45) Date of Patent: Jan. 23, 2024

(54) COMPOUND IMAGES

(71) Applicant: Hewlett-Packard Development Company, L.P., Spring, TX (US)

(72) Inventors: Chih-Chen Hung, Taipei (TW); Hung-Ming Chen, Taipei (TW); Chia-Wen Chuang, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/861,713

(22) Filed: Jul. 11, 2022

(51) Int. Cl.
| | |
|---|---|
| H04L 65/403 | (2022.01) |
| G06V 20/10 | (2022.01) |
| G06V 20/40 | (2022.01) |
| G06V 10/25 | (2022.01) |
| G06T 7/11 | (2017.01) |

(52) U.S. Cl.
CPC .............. G06V 20/41 (2022.01); G06T 7/11 (2017.01); *G06T 2200/24* (2013.01)

(58) Field of Classification Search
CPC ........ G06V 20/41; G06T 7/11; G06T 2200/24
See application file for complete search history.

(56) References Cited

U.S. PATENT DOCUMENTS

| | | | |
|---|---|---|---|
| 7,034,860 | B2 | 4/2006 | Lia et al. |
| 9,798,933 | B1 * | 10/2017 | Meisser ................. H04N 23/90 |
| 11,350,029 | B1 * | 5/2022 | Ostap ........................ G06T 7/70 |
| 2005/0008240 | A1 | 1/2005 | Banerji et al. |
| 2007/0040900 | A1 | 2/2007 | Castles |
| 2007/0263076 | A1 | 11/2007 | Andrews et al. |
| 2022/0237735 | A1 * | 7/2022 | Zingade ................. G06V 20/40 |
| 2022/0400244 | A1 * | 12/2022 | Schaefer ............. H04N 13/204 |
| 2023/0247071 | A1 * | 8/2023 | Yu .......................... G06V 10/70 |
| | | | 348/14.03 |

FOREIGN PATENT DOCUMENTS

| | | | |
|---|---|---|---|
| JP | 2021061527 A | * 4/2021 | ......... G06K 9/00671 |
| NO | 326793 B1 | * 2/2009 | |
| WO | WO-2020184006 A1 | * 9/2020 | |

OTHER PUBLICATIONS

Translation of NO 326793 B1 (Year: 2009).*
Translation of WO 2020184006 A1 (Year: 2020).*
Translation of JP 2021061527 A (Year: 2021).*
Neat Bar Auto Framing—https://support.neat.no/article/neat-symmetry-auto-framing/.

* cited by examiner

*Primary Examiner* — Lixi C Simpson
(74) *Attorney, Agent, or Firm* — Knobbe, Martens, Olson & Bear, LLP

(57) ABSTRACT

In some examples, an electronic device includes an image sensor to capture a source image. In some examples, the electronic device includes a processor to determine, in the source image, a first region that depicts a first person and a second region that depicts a second person. In some examples, the processor is to, in response to determining that the first person is further away than the second person relative to the image sensor based on the first region and the second region, generate a first focus cell that depicts the first person alone. In some examples, the processor is to generate a macro view of the source image that depicts the first person and the second person. In some examples, the processor is to instruct display of a compound image including the macro view and the first focus cell.

18 Claims, 5 Drawing Sheets

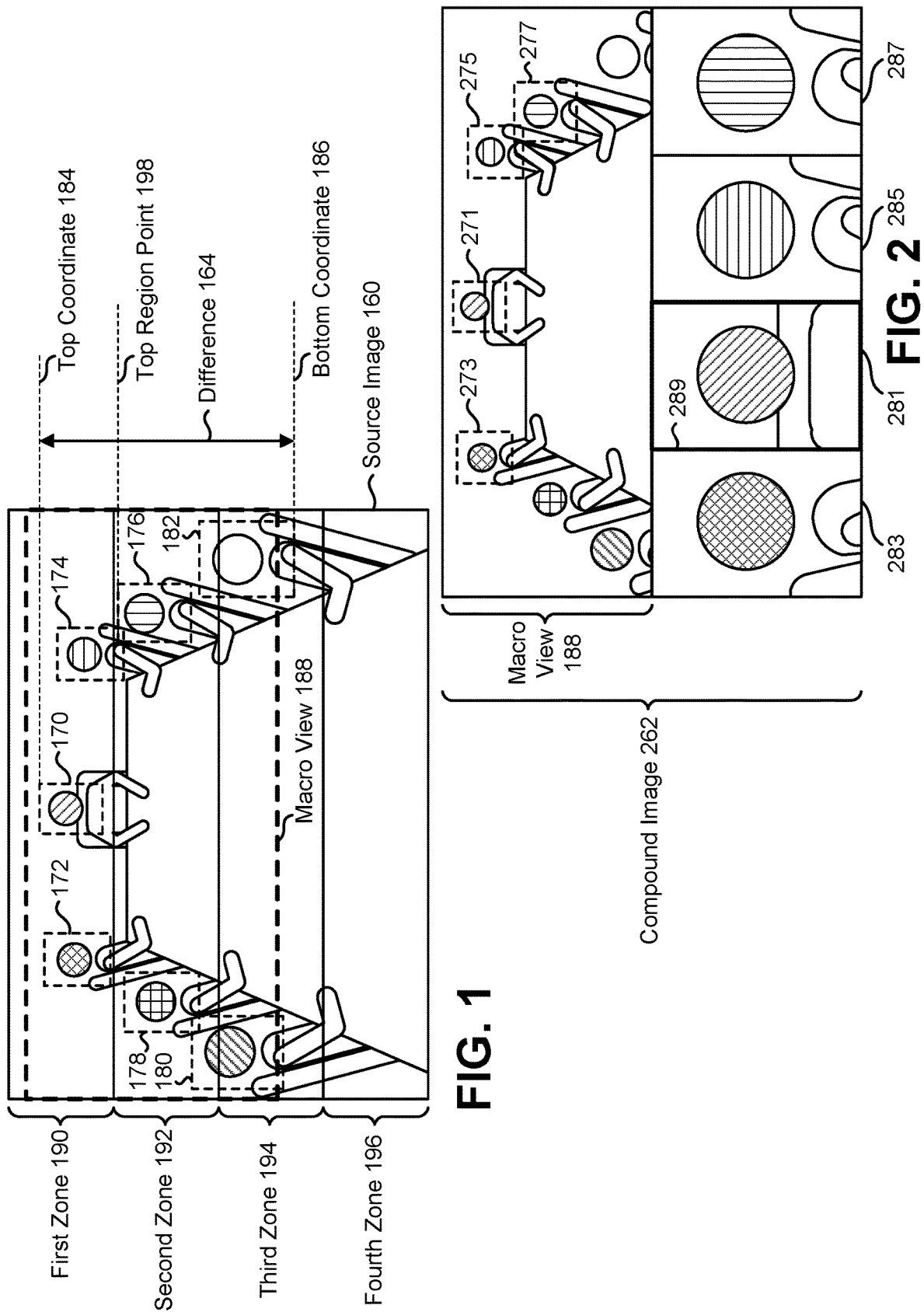

COMPOUND IMAGES

BACKGROUND

Electronic technology has advanced to become virtually ubiquitous in society and has been used for many activities in society. For example, electronic devices are used to perform a variety of tasks, including work activities, communication, research, and entertainment. For instance, computers may be used to participate in virtual meetings over the Internet.

BRIEF DESCRIPTION OF THE DRAWINGS

FIG. 1 is a diagram illustrating an example of a source image that may be utilized to generate a compound image in accordance with some examples of the techniques described herein;

FIG. 2 is a diagram illustrating an example of a compound image in accordance with some examples of the techniques described herein;

DETAILED DESCRIPTION

Figure 3:
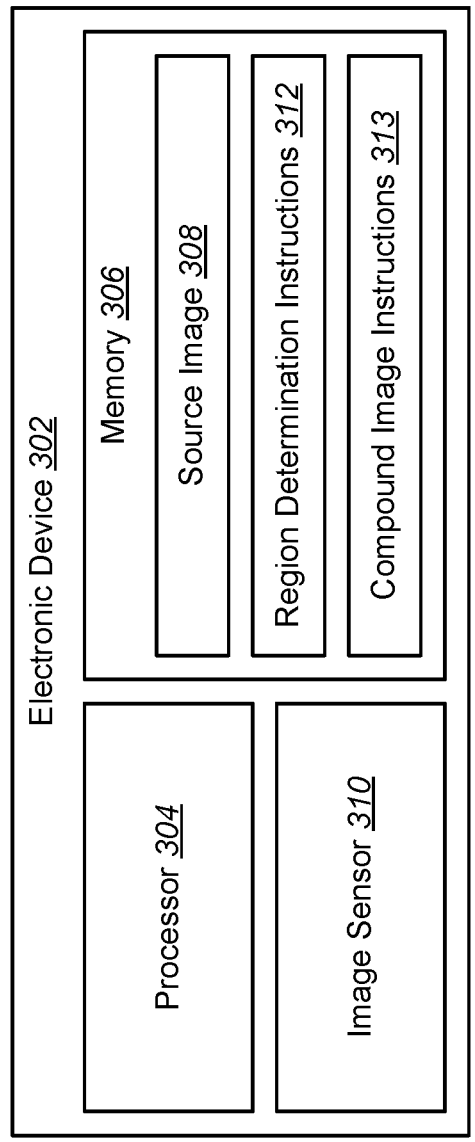
FIG. 3 is a block diagram illustrating an example of an electronic device that may be used to generate a compound image.

People in a video meeting may be displayed with different sizes due to the people being situated at different distances from a camera (in a meeting room, for instance). It may be difficult for a participant that is unfamiliar with other attendees to identify who is speaking.

Some examples of the techniques described herein provide a combination of a wide angle view with an individual view of a person. For instance, showing an individual view may allow a remote participant to more clearly see a person that is sitting relatively farther from the camera (e.g., a person that may appear small in the wide angle view). In some examples, multiple individual views are generated. The individual views may be ordered (e.g., initially ordered) in accordance with an arrangement of people in the video meeting. In some examples, the order may be adjusted over time, which may indicate a speaking sequence.

Throughout the drawings, similar reference numbers may designate similar or identical elements. When an element is referred to without a reference number, this may refer to the element generally, with or without limitation to any particular drawing or figure. In some examples, the drawings are not to scale and the size of some parts may be exaggerated to more clearly illustrate the example shown. Moreover, the drawings provide examples in accordance with the description. However, the description is not limited to the examples provided in the drawings.

FIG. 1 is a diagram illustrating an example of a source image 160 that may be utilized to generate a compound image in accordance with some examples of the techniques described herein. FIG. 2 is a diagram illustrating an example of a compound image 262 in accordance with some examples of the techniques described herein. FIG. 1 and FIG. 2 are described together.

A source image is a digital image captured by an image sensor (e.g., digital camera, web cam, etc.). In some examples, a source image depicts an environment (e.g., conference room, meeting room, office, family room, etc.) in which people (e.g., meeting participants, attendees, etc.) may be situated. In some examples, a source image may have a field of view that is greater than sixty degrees along a horizontal dimension. For instance, a source image may be captured using an image sensor with a wide-angle lens, a fisheye lens, etc. A source image may be captured by an image sensor (e.g., digital camera, web cam, etc.) and provided to an apparatus (e.g., electronic device, computing device, server, etc.). For instance, an apparatus may include an image sensor, may be coupled to an image sensor, may be in communication with an image sensor, or a combination thereof. In the example of FIG. 1, the source image 160 depicts seven people situated around a conference table.

The apparatus may determine a region that depicts a person. For instance, the apparatus may include a processor to execute a machine learning model to detect a person (e.g., face, head and shoulders, etc.). Machine learning is a technique where a machine learning model (e.g., artificial neural network (ANN), convolutional neural network (CNN), etc.) is trained to perform a task based on a set of examples (e.g., data). Training a machine learning model may include determining weights corresponding to structures of the machine learning model. In some examples, artificial neural networks may be a kind of machine learning model that may be structured with nodes, layers, connections, or a combination thereof.

In some examples, a machine learning model may be trained with a set of training images. For instance, a set of training images may include images of an object(s) for detection (e.g., images of a user, people, etc.). In some examples, the set of training images may be labeled with the class of object(s), location (e.g., region, bounding box, etc.) of object(s) in the images, or a combination thereof. The machine learning model may be trained to detect the object(s) by iteratively adjusting weights of the model(s) and evaluating a loss function(s). The trained machine learning model may be executed to detect the object(s) (with a degree of probability, for instance). For example, the source image 160 may be utilized with computer vision techniques to detect an object(s) (e.g., a user, people, etc.).

In some examples, an apparatus uses machine learning, a computer vision technique(s), or a combination thereof to detect a person or people. For instance, an apparatus may detect a location of a person (e.g., face) in a source image and provide a region that includes (e.g., depicts) the person. For instance, the apparatus may produce a region (e.g., bounding box) around a detected face. In some examples, the region may be sized based on the size of the detected person in the image (e.g., sized proportionate to the size of the detected face, sized with a margin from a face edge or detected feature, such as eyes, etc.). In the example of FIG. 1, a first region 170, a second region 172, a third region 174, a fourth region 176, a fifth region 178, a sixth region 180, and a seventh region 182 are provided. For instance, the first region 170 depicts a first person, the second region 172 depicts a second person, the third region 174 depicts a third person, the fourth region 176 depicts a fourth person, and so on.

In some examples, the apparatus may determine a top coordinate of a top region. A top region is a region that is nearest to the top (e.g., 0 in a height dimension or y dimension) of a source image. For instance, the apparatus may determine a region with a height coordinate that is nearest to the top of a source image (e.g., the smallest height coordinate or y coordinate). In the example of FIG. 1, the top region is the first region 170 and the top coordinate 184 is the height coordinate of the top of the first region 170. In some examples, coordinates or values of an image may be expressed as increasing from left to right for a horizontal (e.g., width) dimension and increasing from top to bottom for a vertical (e.g., height) dimension. For instance, the source image 160 may have dimensions of 1920×1080, where an upper left corner of the source image 160 may have coordinates of (0, 0). Other coordinates, ordering (e.g., values increasing from bottom to top of an image, etc.), indexing, or a combination thereof may be utilized in some examples of the techniques described herein. Some examples of the techniques described herein may be given in terms of 1920×1080 image dimensions (e.g., resolution). Some examples of the techniques herein may utilize images with other dimensions (e.g., 3840×2160, 1280×720, etc.).

In some examples, the apparatus may determine a bottom coordinate of a bottom region. A bottom region is a region that is nearest to the bottom (e.g., maximum height in a height dimension or y dimension) of a source image. For instance, the apparatus may determine a region with a height coordinate that is nearest to the bottom of a source image (e.g., the largest height coordinate or y coordinate). In the example of FIG. 1, the bottom region is the seventh region 182 and the bottom coordinate 186 is the height coordinate of the bottom of the seventh region 182.

A macro view is a view (e.g., portion) of an image (e.g., source image) that depicts multiple people. For instance, a macro view may include a complete width of a source image, a subset of the height of a source image, or a combination thereof. For example, the apparatus may generate a macro view 188 of the source image 160 that depicts people (e.g., the first person, the second person, etc.). In some examples, a macro view may be cropped from a source image with a resolution to include every person in the field of view. In some examples, a macro view may be adjusted over time (e.g., over a sequence of source images) by monitoring the movement of people in the area according to person detection (e.g., machine learning detection).

In some examples, the apparatus may generate a macro view based on a top coordinate and a bottom coordinate. In FIG. 1, for instance, the apparatus may generate the macro view 188 based on the top coordinate 184 and the bottom coordinate 186. In some examples, the apparatus may determine whether a difference between a bottom coordinate and a top coordinate is greater than a threshold. In some examples, the threshold is a fraction (e.g., a quarter, a third, a half, three-fifths, a percentage, etc.) of a vertical size of a source image. For instance, the apparatus may determine whether a difference 164 between the bottom coordinate 186 and the top coordinate 184 is greater than half the vertical size (e.g., half the total height) of the source image 160. In the example of FIG. 1, the difference 164 is greater than half the vertical size of the source image 160.

In some examples, in response to determining that a difference is not greater than the threshold, the apparatus may generate a macro view from a source image between a bottom coordinate and a top coordinate. For instance, if a difference is less than or equal to half the height of a source image, the portion of the source image between the bottom coordinate and the top coordinate may be utilized as the macro view (e.g., the portion may be cropped out of the source image and used to generate a part of a compound image, such as a top half or a bottom half).

In response to determining that a difference is greater than the threshold, the apparatus may determine a target zone. A target zone is a portion of a source image that includes a greatest quantity of regions. For example, an apparatus may partition a source image into zones. In the example of FIG. 1, the source image 160 is partitioned into four zones: a first zone 190, a second zone 192, a third zone 194, and a fourth zone 196. In some examples, a different quantity of zones (e.g., two zones, three zones, five zones, etc.) may be utilized. In some examples, a zone may span the entire width of a source image, a subset of a height of a source image, or a combination thereof. In some examples, zones may be sized equally. For instance, the first zone 190, the second zone 192, the third zone 194, and the fourth zone 196 have a same size (e.g., area, quantity of pixels, etc.).

In some examples, an apparatus may determine zone region quantities. A zone region quantity is a quantity of regions associated with a zone. A region may be associated with a zone if the region is within (e.g., partially or completely within) a zone and is not associated with another zone. For instance, an apparatus may determine zone region quantities according to a sequence of zones (e.g., top zone to bottom zone). In the example of FIG. 1, the apparatus may determine zone associations (e.g., count) in a sequence of the first zone 190, the second zone 192, the third zone 194, and the fourth zone 196. For instance, a first zone region quantity of the first zone 190 is three (including the first region 170, the second region 172, and the third region 174), a second zone region quantity of the second zone 192 is four (including the fourth region 176, the fifth region 178, the sixth region 180, and the seventh region 182, while excluding the third region 174 due to being already associated with the first zone 190), a third zone region quantity of the third zone 194 is zero (excluding the sixth region 180 and the seventh region 182 due to being already associated with the second zone 192), and the fourth zone region quantity of the fourth zone 196 is zero. In the example of FIG. 1, the apparatus determines that the second zone 192 is the target zone, because the second zone 192 has the greatest quantity of regions. In some examples, if multiple zones have a same quantity of regions, the apparatus may select a zone that includes or is nearest to a midpoint between the top coordinate 184 and a bottom coordinate 186.

In some examples, an apparatus may determine a top region point associated with a zone (e.g., the target zone) in a source image. A top region point is a top value or coordinate of a region associated with a zone. For instance, the apparatus may determine a highest height coordinate (e.g., the minimum height coordinate or y coordinate) of a highest region associated with a zone. In the example of FIG. 1, the top region point 198 for the second zone 192 (e.g., target zone) is the height coordinate of the top of the fourth region 176.

In some examples, the apparatus may generate a macro view based on a top region point. For instance, the apparatus may determine whether a top region point is spatially below a level coordinate (e.g., half height or another quantity) of the source image. In some examples, the apparatus may determine whether a top region point is greater than the level coordinate (e.g., 1080/2). In the example of FIG. 1, the top region point 198 is less than (e.g., is not greater than) the level coordinate (e.g., the top region point 198 is spatially above the level coordinate, which is a half height in FIG. 1).

In a case that a top region point is not spatially below (e.g., is at or above) a level coordinate, an apparatus may determine a top boundary of a macro view based on a top region point. For instance, an apparatus may determine a top boundary of a macro view using an offset (e.g., a fraction of source image height, source image height/8, 1080/8, etc.) from a top region point. In the example of FIG. 1, the top boundary of the macro view 188 may be positioned at the top region point 198 minus an eighth of the source image 160 height. The macro view 188 may be taken from the source image 160 and may be used to generate a compound image 262 (e.g., positioned at the top half of the compound image 262). In some examples, the macro view 188 may be sized to be half the height of the source image 160 cropped from the top boundary. In some examples, a macro view (e.g., the macro view 188) may be cropped from a source image (e.g., source image 160), resized, scaled, shifted, or a combination thereof for inclusion in a compound image (e.g., compound image 262).

In some examples, an apparatus may determine a bottom region point associated with a zone (e.g., the target zone) in a source image. A bottom region point is a bottom value or coordinate of a region associated with a zone. For instance, the apparatus may determine a lowest height coordinate (e.g., the maximum height coordinate or y coordinate) of a lowest region associated with a zone. In the example of FIG. 1, the bottom region point for the second zone 192 (e.g., target zone) is the height coordinate of the bottom of the seventh region 182. For instance, the bottom region point corresponds to the bottom coordinate 186 in the example of FIG. 1.

In some examples, the apparatus may generate a macro view based on a bottom region point. For instance, the apparatus may determine whether a top region point is spatially below a level coordinate (e.g., half height or another quantity) of a source image. In a case that the top region point is spatially below the level coordinate, an apparatus may determine a top boundary of a macro view based on a bottom region point. For instance, an apparatus may determine the top boundary of the macro view using an offset (e.g., a fraction of source image height, source image height/2, 1080/2, etc.) from the bottom region point. For instance, a top boundary of a macro view may be positioned at the bottom region point minus half of a source image height. The macro view may be cropped out of a source image and used to generate a compound image (e.g., positioned at the top half of a compound image).

In some examples, an apparatus may sort (e.g., order) people, regions, or a combination thereof according to a proximity to an image sensor. In some examples, the people, regions, or combination thereof may be ordered based on region area, pixel quantity, or a combination thereof. For instance, an apparatus may sort regions from smallest region to largest region in terms of region area, pixel quantity, or a combination thereof. In the example of FIG. 1, the apparatus may determine a first quantity of pixels in the first region 170 and a second quantity of pixels in the second region 172. The apparatus may determine that the first person is further away (from the image sensor) than the second person when the first quantity of pixels in the first region 170 is less than the second quantity of pixels in the second region 172. For instance, the apparatus may order the regions in FIG. 1 in the following order: first region 170, second region 172, third region 174, fourth region 176, fifth region 178, sixth region 180, and seventh region 182.

In some examples, an apparatus may generate a focus cell(s) based on the sorting. A focus cell is an image that emphasizes a person (e.g., depicts a person alone, predominantly shows an individual, is approximately horizontally centered on a person's face, etc.). In some examples, generating a focus cell may include formatting image content in a region (e.g., scaling, cropping, or a combination thereof). A focus cell may provide a detailed view (e.g., zoomed-in view) of a person. In some examples, an apparatus may generate focus cells corresponding to a set of people or regions that are furthest from the image sensor. For instance, in response to determining that the first person is further away than the second person relative to the image sensor based on the first region 170 and the second region 172, the apparatus may generate a first focus cell 281 that depicts the first person alone. In some examples, a person or set of people that is furthest from the image sensor may be prioritized for presentation in a focus cell(s). In the examples of FIG. 1 and FIG. 2, the four furthest people away from the image sensor may be selected (e.g., initially selected) for presentation in a focus cell. For instance, the apparatus may generate the first focus cell 281 for the first person (e.g., first region 170). The apparatus may generate a second focus cell 283 that depicts the second person alone (e.g., for the second person, second region 172, or a combination thereof), where the compound image 262 includes the first focus cell 281 and the second focus cell 283. In some examples, the apparatus may generate a third focus cell 285 for the third person (e.g., third region 174) and a fourth focus cell 287 (e.g., fourth region 176).

In some examples, a quantity of focus cells may be fewer than a quantity of people detected, a quantity of people in a source image, or a quantity of people in a macro view. In the examples of FIG. 1 and FIG. 2, seven people appear in the source image 160 and in the macro view 188, while four focus cells are utilized in the compound image 262. A compound image is an image that includes a macro view and a focus cell(s). For instance, a compound image may concurrently show all people in a source image with a more detailed view(s) of an individual(s), may increase an immersive video conference experience, or a combination thereof. In some examples, a compound image may be generated from a source image(s) from a single image sensor, from a single image stream, or a combination thereof. In some examples, a compound image may provide a tidy layout of a macro view combined with focus cells. Different quantities of focus cells (e.g., 1, 2, 3, 4, 5, 6, etc.) may be utilized in a compound image in some examples.

In some examples, an apparatus may order focus cells along a horizontal dimension. For instance, an apparatus may order (e.g., initially order) focus cells according to an order of regions along a horizontal dimension in a source image. In the example of FIG. 1, the focus cells are ordered from left to right as the second focus cell 283, the first focus cell 281, the third focus cell 285, and the fourth focus cell 287 according to the left-to-right ordering of the second region 172, the first region 170, the third region 174, and the fourth region 176.

In some examples, an apparatus may detect a speaker (e.g., a person that is speaking). For instance, an apparatus may utilize machine learning, a computer vision technique, sound direction detection using signals from a microphone array, voice recognition, or a combination thereof to determine which person is speaking. A focus cell may be utilized to indicate a person that is speaking (even with a mask, for instance) based on the speaker detection. In some examples, an apparatus may produce a speaker indicator to indicate which person is speaking. In the example of FIG. 2, a speaker indicator 289 is illustrated as a box outline corresponding to the first focus cell 281. Examples of a speaker indicator may include a box, framing around a focus cell, a color overlay, a color outline around a speaker, a symbol, highlighted text, animated lines, or a combination thereof. Utilizing focus cells (e.g., a speaker indicator) may indicate changes in speakers.

In some examples, a focus cell(s) in a compound image may be changed based on a detected speaker(s). For example, if a person begins to speak that is not shown in a focus cell in a compound image, an apparatus may generate a focus cell corresponding to the new speaker and add the focus cell to the compound image. In some examples, a focus cell of a new speaker may be added as a rightmost focus cell in a compound image and a leftmost focus cell may be removed from the compound image. For instance, each time a new speaker (e.g., speaker not currently shown in a focus cell) is detected, a leftmost focus cell may be removed from a compound image, another focus cell(s) may be shifted to the left, and a focus cell corresponding to the new speaker may be added at the right. In some examples, a rightmost focus cell may be removed from a compound image, another focus cell(s) may be shifted to the right, and a focus cell corresponding to the new speaker may be added at the left. Adding focus cells in a set pattern may indicate an order in which new speakers occur, which may help to indicate which person is talking to a user viewing a compound image. In some examples, a spatial order of people or regions in the source image may be maintained in the focus cells when a new speaker occurs. For instance, a focus cell of a speaker that spoke longest ago (out of the current set of focus cells, for example) may be removed and a focus cell of a new speaker may be added, where the horizontal spatial order of the people in a source image may be maintained when adding the focus cell of the new speaker (e.g., a focus cell(s) may be shifted, separated, moved together, or a combination thereof to maintain the spatial order).

In some examples, an apparatus may generate a region indicator(s) in a compound image, where the region indicator(s) correspond to a focus cell(s) currently included in the compound image. In the example of FIG. 2, a first region indicator 271 corresponding to the first focus cell 281, a second region indicator 273 corresponding to the second focus cell 283, a third region indicator 275 corresponding to the third focus cell 285, and a fourth region indicator 277 corresponding to the fourth focus cell 287 are provided in the macro view 188 of the compound image 262.

In some examples, an apparatus may cause display of (e.g., a processor may instruct display of) a compound image including a macro view and a focus cell. For instance, an apparatus may display a compound image on a display panel or may provide the compound image to a display device for display. In the example of FIG. 2, the compound image 262 may be displayed on a display panel or a display device.

FIG. 3 is a block diagram illustrating an example of an electronic device 302 that may be used to generate a compound image. An electronic device may be a device that includes electronic circuitry. Examples of the electronic device 302 may include a computer (e.g., laptop computer), a smartphone, a tablet computer, mobile device, camera, etc. In some examples, the electronic device 302 may include or may be coupled to a processor 304, memory 306, image sensor 310, or a combination thereof. In some examples, components of the electronic device 302 may be coupled via an interface(s) (e.g., bus(es), wire(s), connector(s), etc.). The electronic device 302 may include additional components (not shown) or some of the components described herein may be removed or modified without departing from the scope of this disclosure. In some examples, the electronic device 302 may include the image sensor 310 (e.g., an integrated camera). In some examples, the electronic device 302 may be in communication with a separate image sensor (e.g., camera). For instance, an image sensor (e.g., web cam, camera, infrared (IR) sensor, depth sensor, radar, etc.) may be attached to the electronic device and may send an image(s) (e.g., video stream) to the electronic device 302. In some examples, an image may include visual information, depth information, IR sensing information, or a combination thereof.

In some examples, the electronic device 302 may include a communication interface(s) (not shown in FIG. 3). The electronic device 302 may utilize the communication interface(s) to communicate with an external device(s) (e.g., networked device, server, smartphone, microphone, camera, printer, computer, keyboard, mouse, etc.). In some examples, the electronic device 302 may be in communication with (e.g., coupled to, have a communication link with) a display device(s). In some examples, the electronic device 302 may include an integrated display panel, touchscreen, button, microphone, or a combination thereof.

In some examples, the communication interface may include hardware, machine-readable instructions, or a combination thereof to enable a component (e.g., processor 304, memory 306, etc.) of the electronic device 302 to communicate with the external device(s). In some examples, the communication interface may enable a wired connection, wireless connection, or a combination thereof to the external device(s). In some examples, the communication interface may include a network interface card, may include hardware, may include machine-readable instructions, or may include a combination thereof to enable the electronic device 302 to communicate with an input device(s), an output device(s), or a combination thereof. Examples of output devices include a display device(s), speaker(s), headphone(s), etc. Examples of input devices include a keyboard, a mouse, a touchscreen, image sensor, microphone, etc. In some examples, a user may input instructions or data into the electronic device 302 using an input device(s).

In some examples, the communication interface(s) may include a mobile industry processor interface (MIPI), Universal Serial Bus (USB) interface, or a combination thereof. The image sensor 310 or a separate image sensor (e.g., webcam) may be utilized to capture a source image 308 and provide the source image 308 to the electronic device 302 (e.g., to the processor 304 or the memory 306). In some examples, the communication interface(s) (e.g., MIPI, USB interface, etc.) may be coupled to the processor 304, to the memory 306, or a combination thereof. The communication interface(s) may provide the source image 308 to the processor 304 or the memory 306 from the separate image sensor.

The image sensor 310 may be a device to sense or capture image information (e.g., an image stream, video stream, etc.). Some examples of the image sensor 310 may include an optical (e.g., visible spectrum) image sensor, red-green-blue (RGB) sensor, IR sensor, depth sensor, etc., or a combination thereof. For instance, the image sensor 310 may be a device to capture optical (e.g., visual) image data (e.g., a sequence of video frames). The image sensor 310 may capture an image (e.g., series of images, video stream, etc.) of a scene. For instance, the image sensor 310 may capture video for a video conference, broadcast, recording, etc. In some examples, the source image 308 may be a frame of a video stream. In some examples, the image sensor 310 may capture the source image 308 with a wide-angle field of view (e.g., 120° field of view).

In some examples, the memory 306 may be an electronic storage device, magnetic storage device, optical storage device, other physical storage device, or a combination thereof that contains or stores electronic information (e.g., instructions, data, or a combination thereof). In some examples, the memory 306 may be, for example, Random Access Memory (RAM), Electrically Erasable Programmable Read-Only Memory (EEPROM), a storage device, an optical disc, the like, or a combination thereof. In some examples, the memory 306 may be volatile or non-volatile memory, such as Dynamic Random Access Memory (DRAM), EEPROM, magnetoresistive random-access memory (MRAM), phase change RAM (PCRAM), memristor, flash memory, the like, or a combination thereof. In some examples, the memory 306 may be a non-transitory tangible machine-readable or computer-readable storage medium, where the term "non-transitory" does not encompass transitory propagating signals. In some examples, the memory 306 may include multiple devices (e.g., a RAM card and a solid-state drive (SSD)). In some examples, the memory 306 may be integrated into the processor 304. In some examples, the memory 306 may include (e.g., store) a source image 308, region determination instructions 312, compound image instructions 313, or a combination thereof.

The processor 304 is logic circuitry. Some examples of the processor 304 may include a general-purpose processor, central processing unit (CPU), a graphics processing unit (GPU), a semiconductor-based microprocessor, field-programmable gate array (FPGA), an application-specific integrated circuit (ASIC), other hardware device, or a combination thereof suitable for retrieval and execution of instructions stored in the memory 306. In some examples, the processor 304 may be an application processor. In some examples, the processor 304 may perform one, some, or all of the aspects, operations, elements, etc., described in one, some, or all of FIG. 1-6. For instance, the processor 304 may process an image(s) (e.g., perform an operation on the source image 308). In some examples, the processor 304 may be logic circuitry to perform object detection, object tracking, feature point detection, region determination, region sorting, focus cell generation, macro view generation, etc., or a combination thereof. The processor 304 may execute instructions stored in the memory 306. In some examples, the processor 304 may include electronic circuitry that includes electronic components for performing an operation or operations described herein without the memory 306. In some examples, the processor 304 may perform one, some, or all of the aspects, operations, elements, etc., described in one, some, or all of FIG. 1-6.

In some examples, the processor 304 may receive a source image 308 (e.g., image sensor stream, video stream, etc.). For instance, the processor 304 may receive the source image 308 from the image sensor 310. In some examples, the processor 304 may receive the source image 308 (e.g., image sensor stream, video stream, etc.) from a separate image sensor. For instance, the processor 304 may receive an image stream via a wired or wireless communication interface (e.g., MIPI, USB port, Ethernet port, Bluetooth receiver, etc.).

In some examples, the processor 304 may execute the region determination instructions 312 to determine, in the source image 308, a first region that depicts a first person and a second region that depicts a second person. For example, the processor 304 may execute the region determination instructions 312 to determine regions as described in FIG. 1-2. In some examples, a machine learning model may be trained to detect a region. A region may indicate a detected object (e.g., face, torso, body, etc.). For instance, a region may be a rectangular region that spans the dimensions of a detected object. In some examples, a machine learning model may be trained using training images that depict an object (e.g., face, torso, body, etc.) for detection. A training image may be labeled with a region located around the object. For instance, the region determination instructions 312 may include a machine learning model trained to detect the first person, the second person, etc. In some examples, the processor 304 may execute the region determination instructions 312 to determine the first region based on the detected first person (e.g., the first person's face) and to determine the second region based on the detected second person (e.g., the second person's face).

In some examples, the processor 304 may execute the compound image instructions 313 to generate a compound image. In some examples, the processor 304 may sort the regions to determine a person or set of people that are furthest from the image sensor 310. The person or set of people that is furthest from the image sensor 310 may be prioritized (e.g., initially prioritized) for focus cell generation, display, or a combination thereof. For instance, the processor 304 may execute the compound image instructions 313 to determine that the first person is further away than the second person relative to the image sensor 310 based on the first region and the second region. For example, the processor 304 may determine that the first region includes fewer pixels than the second region. The processor 304 may execute the compound image instructions 313 to generate a focus cell that depicts the first person alone. In some examples, the processor 304 may produce multiple focus cells. A focus cell may depict an individually tracked person that is framed in the focus cell. In some examples, focus cells may depict the furthest people by face detection area determination and sorting (e.g., prioritization).

In some examples, the processor 304 may execute the compound image instructions 313 to generate a macro view. For instance, the processor 304 may generate a macro view as described in FIG. 1-2. In some examples, the macro view may depict all people in the field of view of the source image 308. For instance, the macro view may depict all people and an environment in the field of view of the image sensor 310. The macro view may provide a view of interactions between people (e.g., attendees to a video conference), may reduce a view of distracting content (e.g., crop out areas of the source image 308 away from the people), or a combination thereof.

In some examples, the processor 304 may partition the source image 308 into zones. For instance, the processor 304 may partition the source image 308 into a first zone and a second zone. The processor 304 may determine a first zone region quantity of the first zone and a second zone region quantity of the second zone. The processor 304 may determine a target zone based on the first zone region quantity and the second zone region quantity. For instance, a zone with a greatest quantity of regions may be selected as the target zone. The target zone may be utilized to produce the macro view. For instance, depending on location of a top region point, the macro view may be produced relative to a top region point or a bottom region point as described in FIG. 1-2. In some examples, the processor 304 may generate a macro view of the source image 308 that depicts the first person and the second person.

In some examples, the processor 304 may execute the compound image instructions 313 to generate a compound image. For instance, the processor 304 may combine a macro view and a focus cell(s) to produce the compound image. In some examples, the electronic device 302 (e.g., communication interface) may send the compound image to a remote device(s). For instance, the compound image may be sent to a remote device(s) participating in a video conference (e.g., online meeting, video call, etc.).

In some examples, the processor 304 may execute the compound image instructions 313 to instruct display of a compound image and the focus cell(s). For instance, the electronic device 302 may provide the compound image to a display panel or display device for display. In some examples, the electronic device 302 may display a compound image including the macro view and the first focus cell.

Figure 4:
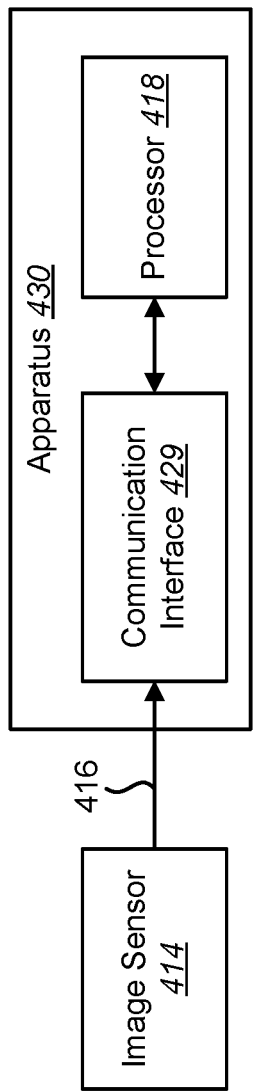
FIG. 4 is a block diagram illustrating an example of an apparatus for compound image generation.

FIG. 4 is a block diagram illustrating an example of an apparatus 430 for compound image generation. In some examples, the apparatus 430 may perform an aspect or aspects of the operations described in FIG. 1, FIG. 2, FIG. 3, or a combination thereof. In some examples, the apparatus 430 may be an example of the electronic device 302 described in FIG. 3, or the electronic device 302 described in FIG. 3 may be an example of the apparatus 430. In some examples, the apparatus 430 may include a processor 418 and a communication interface 429. Examples of the apparatus 430 may include a computing device, smartphone, laptop computer, tablet device, mobile device, etc.). In some examples, one, some, or all of the components of the apparatus 430 may be structured in hardware or circuitry. In some examples, the apparatus 430 may perform one, some, or all of the operations described in FIG. 1-6.

An image sensor 414 may capture a source image 416. For instance, the source image 416 may be a frame of a video stream. In some examples, the source image 416 may depict a scene. In some examples, the source image 416 may depict people in the scene. For instance, the source image 416 may depict a first person and a second person. In some examples, the image sensor 414 may be an example of the image sensor 310 described in FIG. 3. The source image 416 may be provided to the communication interface 429.

The communication interface 429 may receive the source image 416 from the image sensor 414. In some examples, the source image 416 may be provided to the processor 418 from the communication interface 429. In some examples, the processor 418 may be an example of the processor 304 described in FIG. 3. In some examples, the processor 304 described in FIG. 3 may be an example of the processor 418.

The processor 418 may determine, in the source image 416, a first region that includes the first person and a second region that includes the second person. For instance, the processor 418 may determine a region(s) as described in one, some, or all of FIG. 1-3.

The processor 418 may determine that the first person is further away from the image sensor 414 than the second person based on a first area of the first region (e.g., first region width×first region height) and a second area of the second region. For instance, the processor 418 may sort the regions according to region area, pixel quantity, or a combination thereof, as described in one, some, or all of FIG. 1-3 to determine that the first person is further away than the second person.

The processor 418 may determine a horizontal order of the first region and the second region based on a first horizontal position of the first region and a second horizontal position of the second region. The first horizontal position of the first region may be a horizontal coordinate (e.g., x coordinate, leftmost coordinate, center coordinate, etc.) of the first region. The second horizontal position of the second region may be a horizontal coordinate (e.g., x coordinate, leftmost coordinate, center coordinate, etc.) of the second region. For instance, the processor 418 may determine a horizontal order of regions (e.g., minimum to maximum horizontal coordinates, or maximum to minimum horizontal coordinates).

The processor 418 may generate a first focus cell based on the first region and a second focus cell based on the second region. For instance, the processor 418 may generate focus cells as described in one, some, or all of FIG. 1-3. In some examples, the processor 418 may perform an operation(s) on pixel data in the first region to produce the first focus cell, such as scaling, shifting, interpolation, transformation, or a combination thereof. In some examples, the processor 418 may perform an operation(s) on pixel data in the second region to produce the second focus cell, such as scaling, shifting, interpolation, transformation, or a combination thereof.

The processor 418 may generate a macro view of the source image 416 that depicts the first person and the second person. For instance, the processor 418 may generate the macro view as described in one, some, or all of FIG. 1-3. In some examples, the processor 418 may determine (e.g., select and crop out) a portion of the source image 416. For instance, the processor 418 may determine a top coordinate (e.g., minimum y coordinate) of a top region in the source image 416 and a bottom coordinate (e.g., maximum y coordinate) of a bottom region in the source image 416, and may determine whether a difference between the bottom coordinate and the top coordinate is greater than a threshold. In some examples, the threshold may be a fraction of a vertical size (e.g., half of a total height, 1080*0.5=540 pixels, etc.) of the source image 416. In some examples, the processor 418 may generate the macro view from the source image 416 between the bottom coordinate and the top coordinate in response to determining that the difference is not greater than the threshold. In a case that the difference is greater than the threshold, the processor 418 may determine the macro view by determining a target zone and selecting a portion of the source image 416 based on a top region point associated with the target zone, a bottom region point associated with the target region zone, or a combination thereof. In some examples, the processor 418 may perform an operation(s) on the portion to produce the macro view, such as scaling, shifting, interpolation, transformation, or a combination thereof.

The processor 418 may generate a compound image including the first focus cell and the second focus cell in the horizontal order and the macro view. For instance, the processor 418 may combine the macro view and the focus cells to produce the compound image. For instance, the processor 418 may generate the compound image including the macro view in the top half of the compound image and the focus cells in the bottom half of the compound image. In some examples, other arrangements may be utilized (e.g., macro view in the bottom half and focus cells in the top half, macro view in a top third and focus cells in a bottom two-thirds, etc.).

In some examples, the apparatus 430 may display the compound image, may send the compound image to another device(s) for display, store the compound image, or a combination thereof. For instance, the apparatus 430 (e.g., communication interface 429) may transmit the compound image to a remote device (e.g., server, computing device, etc.) that is participating in a video conference with the apparatus 430. The remote device may display the compound image on an integrated display panel or provide the compound image to a display device coupled to the remote device for display.

Figure 5:
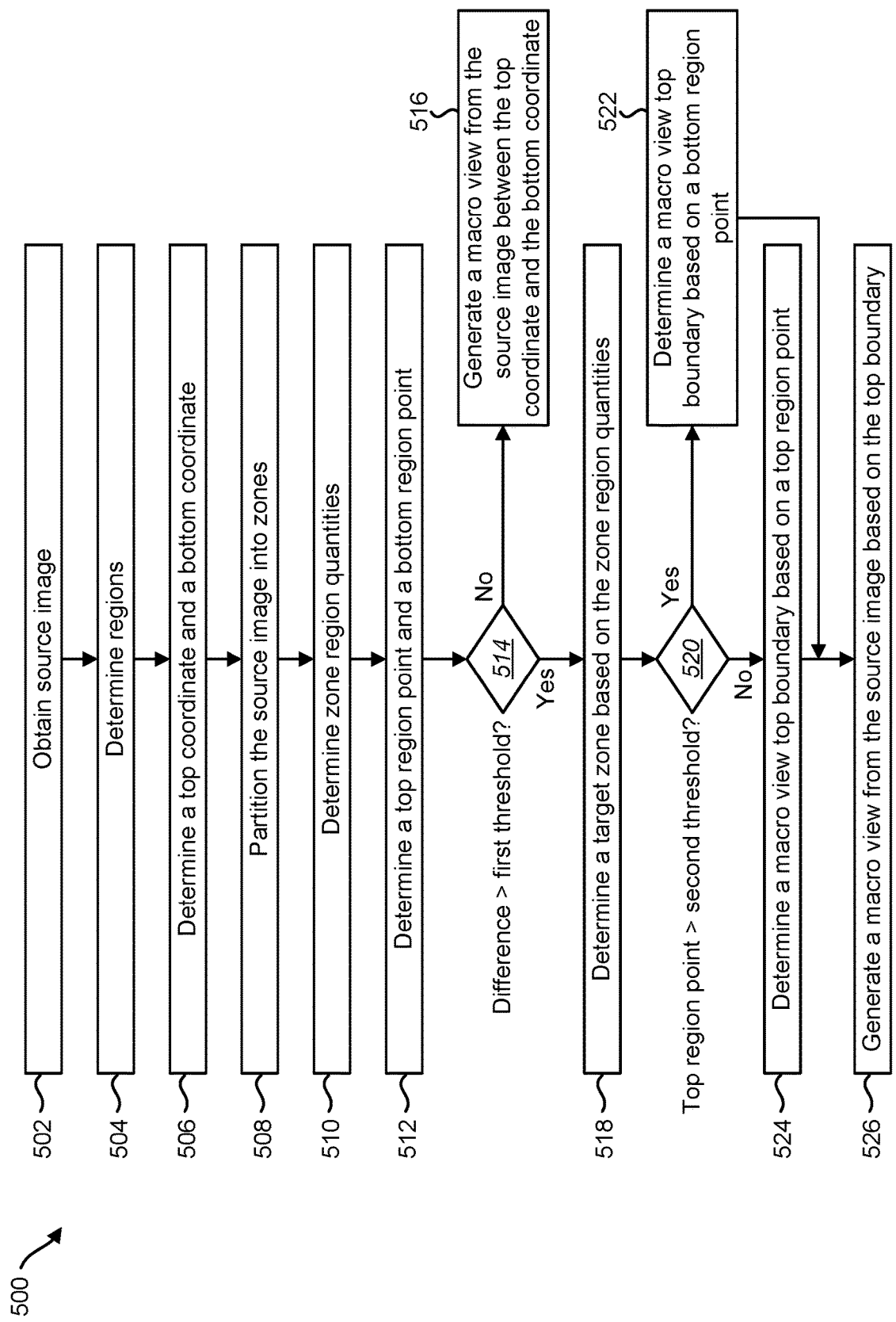
FIG. 5 is a flow diagram illustrating an example of a method for macro view generation.

FIG. 5 is a flow diagram illustrating an example of a method 500 for macro view generation. In some examples, the method 500 or a method 500 element(s) may be performed by an electronic device or apparatus (e.g., electronic device 302, apparatus 430, laptop computer, smartphone, tablet device, etc.). For example, the method 500 may be performed by the electronic device 302 described in FIG. 3 or the apparatus 430 described in FIG. 4.

At step 502, an apparatus may obtain a source image. In some examples, the apparatus may obtain a source image as described in one, some, or all of FIG. 1-4. For instance, the apparatus may capture the source image using an integrated image sensor or may receive the source image from a linked image sensor (e.g., connected web cam).

At step 504, the apparatus determines regions. In some examples, the apparatus may determine regions as described in one, some, or all of FIG. 1-4. For instance, the apparatus may perform face or person detection and produce a region for each detected face or person.

At step 506, the apparatus may determine a top coordinate and a bottom coordinate. In some examples, the apparatus may determine the top coordinate and the bottom coordinate of the regions as described in one, some, or all of FIG. 1-4.

At step 508, the apparatus may partition the source image into zones. In some examples, the apparatus may partition the source image into zones (e.g., four horizontal zones) as described in one, some, or all of FIG. 1-4.

At step 510, the apparatus may determine zone region quantities. In some examples, the apparatus may determine zone region quantities as described in one, some, or all of FIG. 1-4.

At step 512, the apparatus may determine a top region point and a bottom region point. In some examples, the apparatus may determine the top region point and the bottom region point (for a zone(s), for instance) as described in one, some, or all of FIG. 1-4. For instance, the apparatus may determine a top region point corresponding to a top coordinate (e.g., minimum y coordinate) of a top region associated with the target region. The apparatus may determine a bottom region point corresponding to a bottom coordinate (e.g., maximum y coordinate) of a bottom region associated with the target region.

At step 514, the apparatus may determine whether a difference between the bottom coordinate and the top coordinate is greater than a first threshold (e.g., half height of the source image, 1080/2, etc.). In some examples, the apparatus may determine zone region quantities as described in one, some, or all of FIG. 1-4.

In a case that the difference is not greater than the first threshold, the apparatus may generate a macro view from the source image between the top coordinate and the bottom coordinate at step 516. For instance, the macro view may be extracted from (e.g., copied from, cropped from, etc.) the source image between the top coordinate and the bottom coordinate.

In a case that the difference is greater than the first threshold, the apparatus may determine a target zone based on the zone region quantities at step 518. In some examples, the apparatus may determine the target zone as described in one, some, or all of FIG. 1-4. For instance, the apparatus may select a zone that has a greatest quantity of associated regions as the target zone.

At step 520, the apparatus may determine whether a top region point is greater than a second threshold (e.g., half height of the source image, 1080/2, etc.). In some examples, the apparatus may determine whether the top region point is greater than the second threshold as described in one, some, or all of FIG. 1-4. In some examples, the first threshold and the second threshold may be the same quantity or different quantities.

In a case that the top region point is greater than the second threshold, the apparatus may determine a macro view top boundary based on a bottom region point at step 522. In some examples, the apparatus may determine the macro view top boundary as described in one, some, or all of FIG. 1-4. In some examples, the apparatus may determine the macro view top boundary as the bottom region point minus a value (e.g., half height of the source image, 1080/2, second threshold, another value, etc.).

At step 526, the apparatus may generate a macro view from the source image based on the top boundary. In some examples, the apparatus may generate the macro view based on the top boundary as described in one, some, or all of FIG. 1-4. For instance, the apparatus may extract the macro view from (e.g., copy the macro view from, crop the macro view from) the source image from the top boundary with a macro view size (e.g., 1920×540, source image width and half height, etc.). In some examples, the apparatus may extract the macro view from between the top boundary and the bottom region point.

In a case that the top region point is not greater than the second threshold, the apparatus may determine a macro view top boundary based on a top region point at step 524. In some examples, the apparatus may determine the macro view top boundary as described in one, some, or all of FIG. 1-4. For instance, the apparatus may determine the macro view top boundary as the top region point minus a value (e.g., eighth height of the source image, 1080/8, margin size, another value, etc.). At step 526, the apparatus may generate a macro view from the source image based on the top boundary.

In some examples, the method 500 may include generating a compound view based on the macro view (and a focus cell(s), for instance), displaying the compound view, transmitting the compound view, saving the compound view, or a combination thereof. For instance, the apparatus may generate the compound view as described in one, some, or all of FIG. 1-4.

Figure 6:
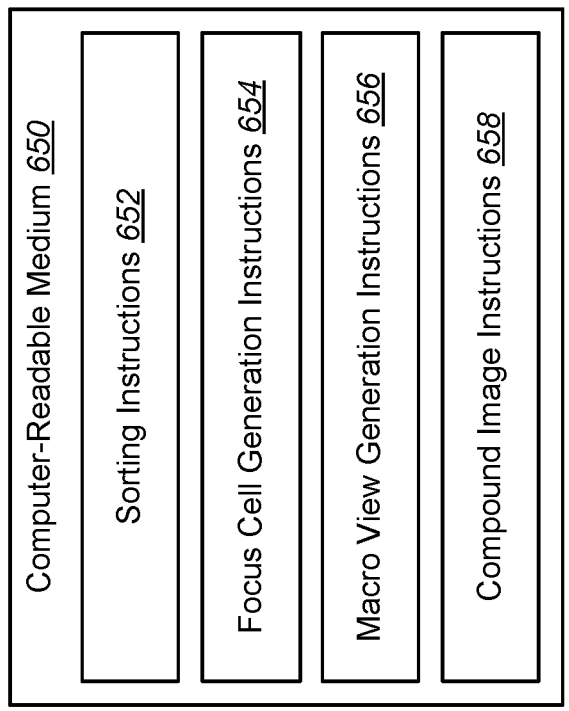
FIG. 6 is a block diagram illustrating an example of a computer-readable medium for compound image generation.

FIG. 6 is a block diagram illustrating an example of a computer-readable medium 650 for compound image generation. The computer-readable medium 650 is a non-transitory, tangible computer-readable medium. In some examples, the computer-readable medium 650 may be, for example, RAM, DRAM, EEPROM, MRAM, PCRAM, a storage device, an optical disc, the like, or a combination thereof. In some examples, the computer-readable medium 650 may be volatile memory, non-volatile memory, or a combination thereof. In some examples, the memory 306 described in FIG. 3 may be an example of the computer-readable medium 650 described in FIG. 6.

The computer-readable medium 650 may include data (e.g., information, executable instructions, or a combination thereof). In some examples, the computer-readable medium 650 may include sorting instructions 652, focus cell generation instructions 654, macro view generation instructions 656, compound image instructions 658, or a combination thereof.

The sorting instructions 652 may include instructions when executed cause a processor of an electronic device to sort a plurality of regions of a source image to determine that a first person in a first region and a second person in a second region are further from an image sensor. In some examples, sorting a plurality of regions may be performed as described in one, some, or all of FIG. 1-5.

The focus cell generation instructions 654 may include instructions when executed cause the processor to generate a first focus cell including the first person alone based on the first region and a second focus cell including the second person alone based on the second region. In some examples, generating focus cells may be performed as described in one, some, or all of FIG. 1-5.

The macro view generation instructions 656 may include instructions when executed cause the processor to generate a macro view of the source image that depicts the first person and the second person. In some examples, generating the macro view may be performed as described in one, some, or all of FIG. 1-5.

The compound image instructions 658 may include instructions when executed cause the processor to generate a compound image including the macro view, the first focus cell, and the second focus cell. In some examples, generating the compound image may be performed as described in one, some, or all of FIG. 1-5. In some examples, the macro view occupies half (e.g., top half or bottom half) of the compound image.

In some examples, the compound image instructions 658 may include instructions when executed cause the processor to remove the first focus cell and add a third focus cell in response to a detection of a third person speaking. For instance, the first focus cell may be removed from the compound image or may be omitted in a subsequent compound image based on a subsequent source image. In some examples, removing a focus cell(s), adding a focus cell(s), or a combination thereof may be performed as described in one, some, or all of FIG. 1-5. For instance, the first focus cell may be removed from a left side, the second focus cell may be shifted leftward, and the third focus cell may be added to a right side.

As used herein, items described with the term "or a combination thereof" may mean an item or items. For example, the phrase "A, B, C, or a combination thereof" may mean any of: A (without B and C), B (without A and C), C (without A and B), A and B (without C), B and C (without A), A and C (without B), or all of A, B, and C.

While various examples are described herein, the described techniques are not limited to the examples. Variations of the examples are within the scope of the disclosure. For example, operation(s), aspect(s), or element(s) of the examples described herein may be omitted or combined.

What is claimed is:

1. An electronic device, comprising:
   an image sensor to capture a source image; and
   a processor to:
   determine, in the source image, a first region that depicts a first person and a second region that depicts a second person;
   in response to determining that the first person is further away than the second person relative to the image sensor based on the first region and the second region, generate a first focus cell that depicts the first person alone;
   generate a macro view of the source image that depicts the first person and the second person, wherein the macro view is generated from the source image between a top coordinate of a top region in the source image and a bottom coordinate of a bottom region in the source image in response to determining that a difference between the top coordinate and the bottom coordinate is greater than a threshold; and
   instruct display of a compound image including the macro view and the first focus cell.

2. The electronic device of claim 1, wherein the source image has a field of view that is greater than sixty degrees along a horizontal dimension.

3. The electronic device of claim 1, wherein the processor is to determine a first quantity of pixels in the first region and a second quantity of pixels in the second region.

4. The electronic device of claim 3, wherein the processor is to determine that the first person is further away than the second person when the first quantity of pixels in the first region is less than the second quantity of pixels in the second region.

5. The electronic device of claim 1, wherein the processor is to order the first focus cell and a second focus cell along a horizontal dimension.

6. The electronic device of claim 1, wherein the processor is to generate a second focus cell that depicts the second person alone, wherein the compound image includes the first focus cell and the second focus cell.

7. The electronic device of claim 1, wherein the processor is to partition the source image into a first zone and a second zone.

8. The electronic device of claim 7, wherein the processor is to determine a first zone region quantity of the first zone and a second zone region quantity of the second zone.

9. The electronic device of claim 8, wherein the processor is to determine a target zone based on the first zone region quantity and the second zone region quantity.

10. The electronic device of claim 1, wherein the processor is to determine a top region point associated with a zone in the source image, and wherein the processor is to generate the macro view based on the top region point.

11. The electronic device of claim 10, wherein the processor is to determine a bottom region point associated with the zone in the source image, and wherein the processor is to generate the macro view based on the bottom region point.

12. An apparatus, comprising:
    a communication interface to receive a source image from an image sensor, wherein the source image depicts a first person and a second person; and
    a processor to:
    determine, in the source image, a first region that includes the first person and a second region that includes the second person;
    determine that the first person is further away from the image sensor than the second person based on a first area of the first region and a second area of the second region;
    determine a horizontal order of the first region and the second region based on a first horizontal position of the first region and a second horizontal position of the second region;
    generate a first focus cell based on the first region and a second focus cell based on the second region;
    generate a macro view of the source image that depicts the first person and the second person, wherein the macro view is generated from the source image between a top coordinate of a top region in the source image and a bottom coordinate of a bottom region in the source image in response to determining that a difference between the top coordinate and the bottom coordinate is greater than a threshold; and
    generate a compound image including the first focus cell and the second focus cell in the horizontal order and the macro view.

13. The apparatus of claim 12, wherein the threshold is a fraction of a vertical size of the source image.

14. The apparatus of claim 12, wherein the processor is to generate the macro view from the source image between the bottom coordinate and the top coordinate in response to determining that the difference is not greater than the threshold.

15. A non-transitory tangible computer-readable medium comprising instructions when executed cause a processor of an electronic device to:
- sort a plurality of regions of a source image to determine that a first person in a first region and a second person in a second region are furthest from an image sensor;
- generate a first focus cell including the first person alone based on the first region and a second focus cell including the second person alone based on the second region;
- generate a macro view of the source image that depicts the first person and the second person, wherein the macro view is generated from the source image between a top coordinate of a top region in the source image and a bottom coordinate of a bottom region in the source image in response to determining that a difference between the top coordinate and the bottom coordinate is greater than a threshold; and
- generate a compound image including the macro view, the first focus cell, and the second focus cell.

16. The non-transitory tangible computer-readable medium of claim 15, wherein the macro view occupies half of the compound image.

17. The non-transitory tangible computer-readable medium of claim 15, wherein the instructions when executed cause the processor to remove the first focus cell and add a third focus cell in response to a detection of a third person speaking.

18. The non-transitory tangible computer-readable medium of claim 17, wherein the first focus cell is removed from a left side, the second focus cell is shifted leftward, and the third focus cell is added to a right side.

\* \* \* \* \*